United States Patent Office 3,263,106
Patented July 26, 1966

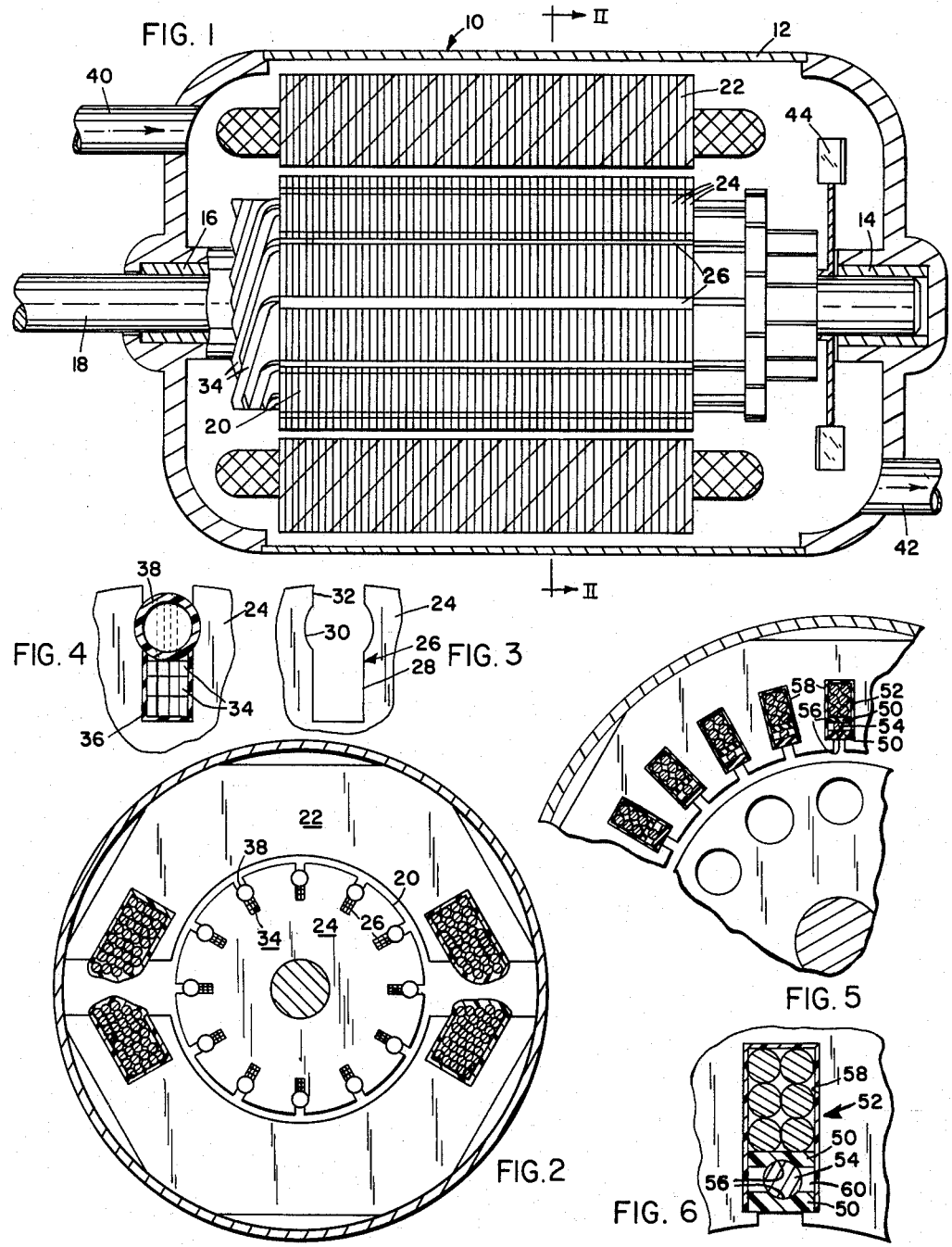

3,263,106
DYNAMOELECTRIC MACHINE
Raymond T. Divers, Camillus, N.Y., assignor to Carrier Corporation, Syracuse, N.Y., a corporation of Delaware
Filed May 1, 1963, Ser. No. 277,167
3 Claims. (Cl. 310—54)

This invention relates broadly to dynamoelectric machinery. More particularly, this invention relates to a dynamoelectric machine construction conducive to efficient cooling of the heat generating components of the machine.

In conventional dynamoelectric machinery of the kind to which this invention refers, there is included a rotor and a stator, one or both of which, contain electric conductors assembled therein. The rotor construction consists of a core member of generally circular shape secured to the shaft of the machine. Often the core member is composed of a plurality of plate-like members referred to as laminations secured together against relative movement. In order that the windings formed by the electric conductors be assembled within the rotor, each of the laminations contains a plurality of slots circumferentially spaced about the plate. When the laminations are assembled, the slots are in registry and form a continuous opening extending the length of the rotor. The conductors are placed in the continuous opening and have their terminal ends secured to a commutator which is electrically connected in a circuit supplying energy to the windings.

During operation of the machine, the rotor member experiences an increase in temperature. In order that the rotor be cooled so that efficient operation of the machine may ensue, it is necessary that provision be made for rejecting the heat generated to a cooling medium.

In addition, it will be appreciated that as the rotor rotates circumferential forces are developed tending to urge the windings outwardly from their position in the slots forming the continuous opening. In order to prevent this movement, it is common practice to wedge the windings in the slots with a slot stick or wedge.

This invention, in its preferred form, provides slot stick means of a particular configuration enabling the slot stick means to be used as a passage for the flow of cooling medium through the motor, while at the same time, securing the conductors against movement relative to the laminations. To this end, there is provided slot stick means of an expansible nature which may be assembled within the slot in a collapsed condition and thereafter expanded in the slot to a configuration determined by the shape of the slot so that a wedging action may be obtained. The slot stick is preferably formed so as to be hollow enabling the expansion to be accomplished hydraulically if desired. Once the slot stick has been expanded it will assume the shape of the slot so that cooling medium may flow down through the space defined by the inner dimension of the hollow slot stick.

The chief object of this invention is the provision of an improved dynamoelectric machine construction wherein the means for preventing relative movement between the windings and the rotor may be utilized as a passage for the flow of cooling medium through the machine.

A further object of this invention is the provision of an improved dynamoelectric machine wherein cooling of the heat generating components is accomplished in the location of the machine where heat generation is at a maximum.

An additional object of the invention is the provision of an improved method of cooling a dynamoelectric machine which includes the steps of utilizing slot wedging means of the kind used to secure a winding to a rotor as a passage for the flow of cooling medium.

Other objects and features of the invention will be apparent upon a consideration of the ensuing specification and drawings in which:

FIGURE 1 is a schematic representation of a dynamoelectric machine constructed in accordance with the invention;

FIGURE 2 is a cross-section of the machine illustrated in FIGURE 1 taken along lines II—II of FIGURE 1;

FIGURE 3 is a fragmentary view of a rotor lamination illustrating the shape of a slot for accommodating the electric conductors forming the windings of a dynamoelectric machine;

FIGURE 4 is similar to FIGURE 3 illustrating the position of the slot wedging means and the windings. The dashed lines illustrate the slot wedging means prior to expansion while the solid, generally circular section illustrates the slot wedging means subsequent to expansion to the slot conforming configuration.

FIGURE 5 is a partial view, in section, showing a modified form of the invention; and FIGURE 6 is an enlarged view of a portion of FIGURE 5.

Referring more particularly to the drawings for the purpose of describing an embodiment of the invention, there is shown a dynamoelectric machine 10 constructed in accordance with the teachings of this invention. The machine 10 includes a housing 12 for supporting the various components of the machine. Housing 12 mounts bearings 14 and 16 which, in turn, supports shaft 18. Secured to the shaft is rotor member 20 arranged to rotate within stator member 22 encircling the rotor member.

In the construction shown, the rotor 20 is composed of a number of plates 24 of magnetic material such as soft iron. Each of the plates is provided with a plurality of slots or openings 26 extending from the periphery thereof at circumferentially spaced locations about the plate. Slot 26, note FIGURE 3, includes a lower portion 28, an intermediate portion 30 and an upper portion 32. As will be evident from a consideration of FIGURE 4, the electric conductors 34 illustrated as windings, are positioned within portion 28 of slot 26 and are provided with a member 36 conventionally known as a slot liner formed of insulating material. The slot liner encloses the windings 34 in the manner illustrated in FIGURE 4.

In order to prevent relative movement between the windings 34 and the plate members 24, there is provided a tubular wedging means 38 formed of a material permitting it to be passed through portion 32 of the opening in a collapsed condition and expanded into tight intimate contact with section 30 of the slot all in the manner shown in FIGURE 4.

It will be appreciated that dependent upon the dynamoelectric machine design, the electric conductor members 34 may be assembled in a number of ways such as secured to commutator members disposed on the shaft 18 adjacent the ends of the rotor 20. In order that the heat generated by the current passing through the conductors as well as that generated by the magnetic fields concentrated in the air gap region, be dissipated, there is a connection 40 to the housing 12 for the purpose of introducing cooling medium therein. There is also shown a connection 42 secured to the housing 12 for the purpose of removing cooling medium from the housing.

With the construction shown, the cooling medium may be supplied through line 40 to the interior of the housing and flow under influence of fan member 44 to the portion of the housing accommodating line 42. Movement of the cooling fluid through the housing occurs through the air gap and the space provided by the expanded tubular members 38.

While this invention is not limited to the use of any specific material in connection with the fabrication of member 38, it has been determined that dielectric materials such as "B" staged polymerizable resins filled with random glass fiber material initially capable of the deformation required and subsequently curable to a permanent rigid configuration, as well as certain metals such as high non-magnetic resistivity stainless steels, are suitable for the use intended.

Although the invention has been described as it applies to a rotor construction, it will be obvious to those skilled in the art that the invention may be employed in connection with a stator construction. Additionally, it will be appreciated that the slot wedging unit used may assume other forms than illustrated in FIGURE 4. For example, FIGURES 5 and 6 show a stator having a continuous opening extending axially thereof in which a modified slot stick or wedge is employed. Here, two elongated members 50 of a length coextensive with the continuous axial opening are loosely arranged within a slot 52 in the manner illustrated. Elongated rod 54 is inserted between members 50 in engagement with confronting recesses 56. The parts are so dimensioned that the members 50 tightly engage the slot liner embracing the conductors and the walls 58 defining the slot 52. With this arrangement the spaces 60 serve as a passage for flow of a cooling medium. It will be obvious from the configuration of slot 52 that members 50 are slidably assembled through an end of the opening.

Both the slot wedging means disclosed may be used with either the stator or rotor depending upon the particular motor design involved. Additionally, rod 54 may be a tube of the kind illustrated in FIGURES 3 and 4.

While I have described a preferred embodiment of my invention, it will be understood that the invention is not limited thereto, since it may be otherwise embodied within the scope of the following claims.

I claim:
1. A dynamoelectric motor construction comprising a power shaft, a rotor member secured to said shaft, a stator member, electric conductor means disposed within said rotor member, expansible means securing said electric conductor means in said rotor and means for supplying cooling medium in heat transfer relation with said motor parts, said means having communication with said expansible means when the latter has been expanded to secure said electric conductor means whereby said expansible means serves as a passageway for the flow of cooling medium.

2. A dynamoelectric machine comprising a rotor and a stator, at least one of which is provided with an opening extending longitudinally thereof, electric conductor means positioned to be supported within said opening, expansible means disposed in said opening to overlie said electric conductor means, said expansible means upon expansion thereof securing said conductor means against movement relative to said opening while providing a passage for the flow of motor cooling medium and means for supplying cooling medium to said motor components.

3. The invention set forth in claim 2 wherein said expansible means includes a first elongated planar member having a recess in one surface thereof arranged in said opening, a second elongated planar member having a recess in one surface thereof arranged in said opening with the surface having the recess confronting the surface of said first member having the recess and a rod forcibly engaging the recess portions of said members to tightly secure said conductors in said opening.

References Cited by the Examiner
UNITED STATES PATENTS

| 2,269,237 | 1/1942 | Wieseman | 310—57 |
|---|---|---|---|
| 2,497,650 | 2/1950 | Anderson | 310—214 |
| 2,961,716 | 11/1960 | Luenberger | 310—86 |

MILTON O. HIRSHFIELD, *Primary Examiner.*

L. L. SMITH, *Assistant Examiner.*